Aug. 15, 1939.  J. M. DE NAULT  2,169,913
AUTOMOBILE JACK
Filed Aug. 11, 1938  2 Sheets-Sheet 1
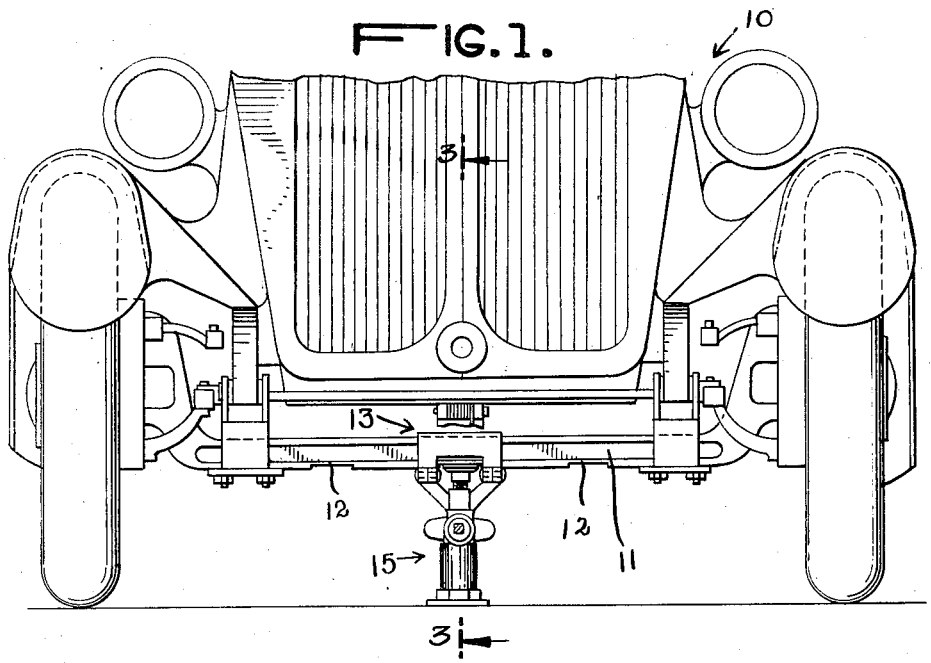
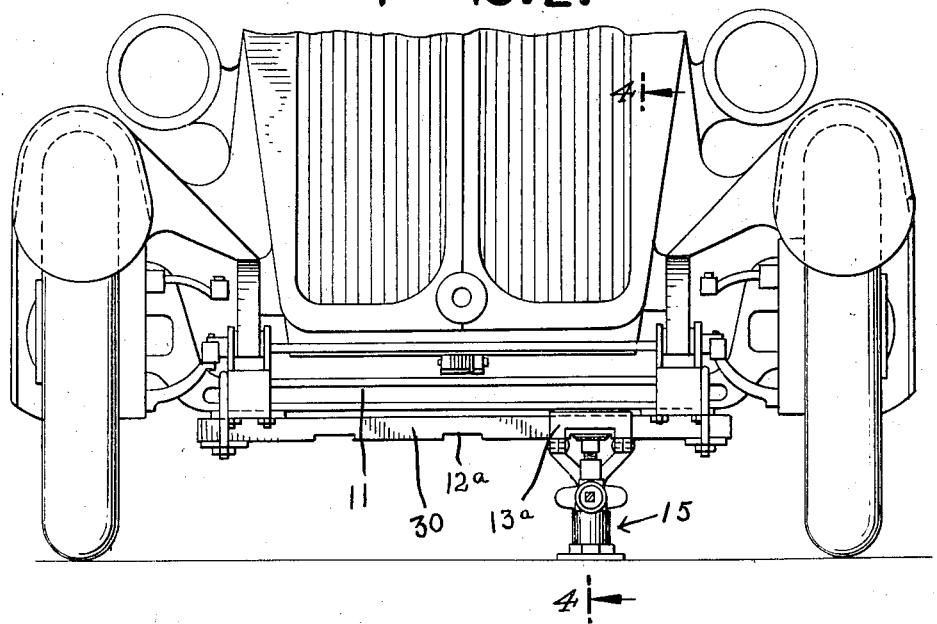
INVENTOR.
JOSEPH M. DE NAULT.
BY Carl Miller
ATTORNEY.

Aug. 15, 1939. J. M. DE NAULT 2,169,913
AUTOMOBILE JACK
Filed Aug. 11, 1938 2 Sheets-Sheet 2
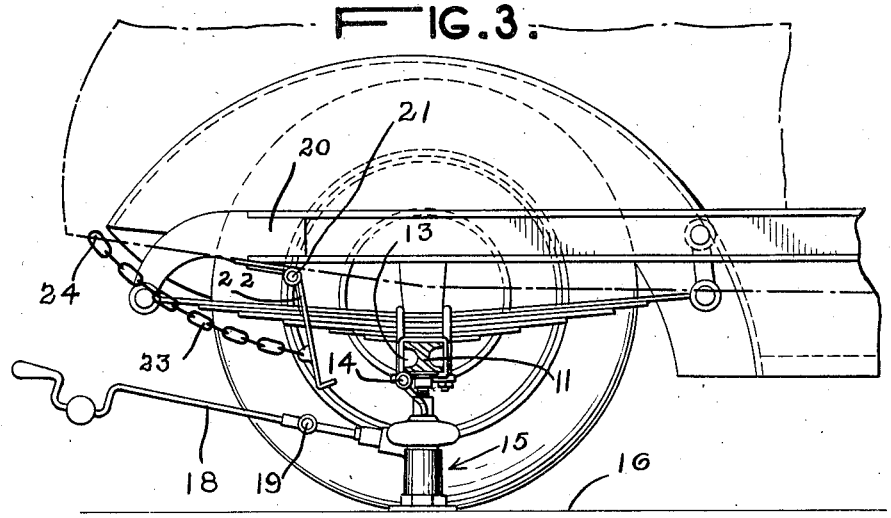
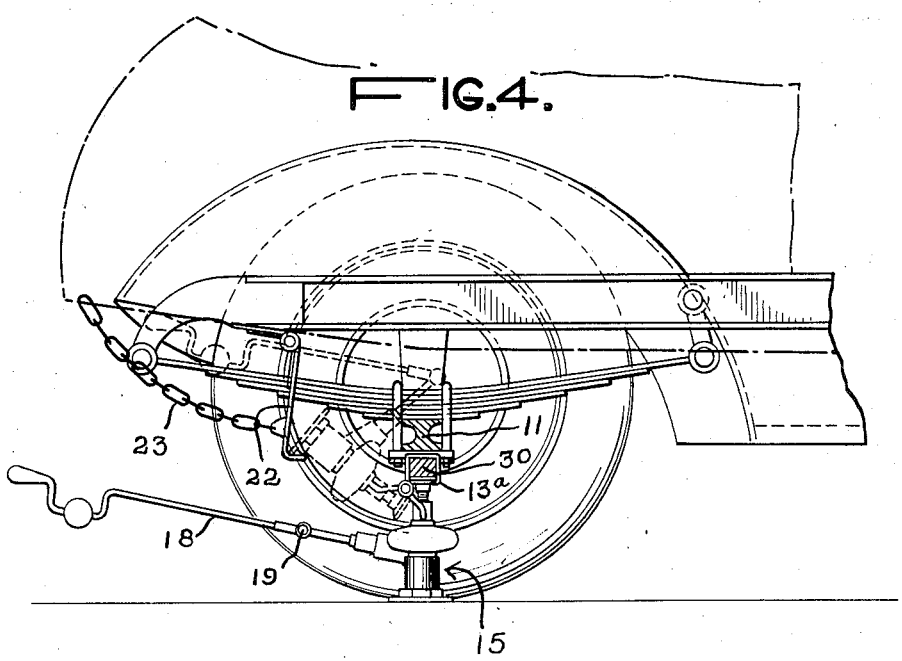
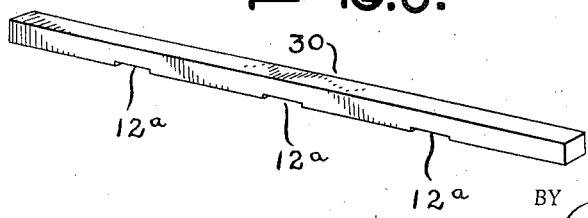
INVENTOR.
JOSEPH M. DE NAULT.
BY Carl Miller
ATTORNEY.

Patented Aug. 15, 1939

2,169,913

UNITED STATES PATENT OFFICE 2,169,913

AUTOMOBILE JACK

Joseph M. De Nault, New York, N. Y.

Application August 11, 1938, Serial No. 224,283

1 Claim. (Cl. 254—86)

This invention relates to automobile jacks. It is particularly directed to a jack which is permanently mounted on the automobile, and which may be swung out of the way when not in use, and held in such position until the jack is to be used.

A further object of this invention is to provide a jack of the character described carried by the automobile, and adjustable to various positions with respect to the longitudinal center of the automobile, whereby the automobile may be lifted at the middle or on the left side or on the right side.

A further object of this invention is to provide a rugged, durable and compact automobile jack of the character described, which shall be relatively inexpensive to manufacture, easy to manipulate, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawings, in which is shown one of the various possible illustrative embodiments of this invention, Figure 1 is a front, elevational view of an automobile provided with a jack embodying the invention;

Figure 2 is a front, elevational view, similar to Figure 1, but illustrating a modified construction;

Figure 3 is a cross-sectional view taken on line 3—3 of Figure 1;

Figure 4 is a cross-sectional view taken on line 4—4 of Figure 2, and showing, in dotted lines, a jack and the crank for the jack in the position to which the same are swung and retained when the jack is not in use; and Figure 5 is a perspective view of the bar shown in Figures 2 and 4 which adjustably supports the jack.

Referring now in detail to the drawings, and particularly to Figures 1 and 3, 10 designates an automobile having a front axle 11. The axle 11 is provided with a plurality of spaced shallow grooves 12 on the underside thereof. Mounted on the front axle 11 and longitudinally slidable thereon is a bracket 13.

Hinged to the bracket 13, as at 14, is an automobile jack 15 of any suitable construction, adapted to hang vertically when the jack is swung downwardly. The jack 15 may be of any suitable construction and may be raised or lowered by a crank 18 connected thereto by a hinge connection 19. The bracket 13 may be slidably moved to bring the jack 15 below any one of the grooves 12. There are preferably three grooves, one located at the longitudinal middle of the automobile, and one on each side thereof. With this construction, the automobile may be raised either at the middle or at the left side or at the right side.

Means is provided to support the jack in upwardly swung position out of the way, when the jack is not in use. To this end, there is hinged to the frame 20, as at 21, a hook 22. The hinge is preferably located forwardly of the front axle 11, and in alignment with the central groove 12. The lower end of the hook 22 is connected by a chain or other flexible member 23 to the chassis of the automobile, as at 24.

It will now be understood that the jack 15 may be swung upwardly about hinge 14, and engaged with the hook 22, to hold the jack out of the way when the latter is not in use. When the jack is swung upwardly, the crank 18 will pivot about the hinge connection 19, so as to be carried beneath the chassis of the automobile, as illustrated in Figure 4 of the drawings.

It will now be understood that the jack 15 must be moved to the middle of the axle 11 before it is swung upwardly for engagement with the hook 22. When it is desired to use the jack, the chain 23 is pulled to disengage the hook from the jack, which may then swing downwardly to operative position.

When it is desired to swing the jack to inoperative position, the crank 18 is first turned sufficiently to lift the jack off the ground so as to provide sufficient clearance for this purpose.

As shown in Figure 3, the hinge connection 14 between the jack 15 and the bracket 13 is preferably located at the front of the bracket, whereby to facilitate forward swinging movement of the jack.

In Figures 2 and 4, the jack 15, instead of being slidably supported on the front axle 11, is slidably carried by a bar 30 fixed to said front axle and disposed therebelow and parallel thereto. The bar 30 is provided with grooves 12a, similar to the grooves 12 shown in Figure 1.

Slidably carried by the bar 30 is the bracket 13a to which the jack 15 is hinged.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desired to secure by Letters Patent:

An automobile having a front axle formed with a plurality of spaced grooves at the underside theref, a bracket slidably mounted on said axle, and movable longitudinally thereof to positions in alignment with said grooves, an automobile jack hinged to said bracket about a horizontal axis, a crank for raising or lowering said jack having a hinged connection to said jack, a hook hinged to said automobile and adapted to engage said jack when the latter is swung upwardly away from the ground, and a chain interconnecting said hook with the chassis of the automobile.

JOSEPH M. DE NAULT.